(12) United States Patent
Moshammer

(10) Patent No.: US 6,969,199 B2
(45) Date of Patent: Nov. 29, 2005

(54) FLOATING BEARING

(75) Inventor: Horst Moshammer, Linz am Rhein (DE)

(73) Assignee: Igus Spritzgubteile Fur Die Industrie GmbH, Cologne (DE)

(*) Notice: Subject to any disclaimer, the term of this patent is extended or adjusted under 35 U.S.C. 154(b) by 356 days.

(21) Appl. No.: 10/343,661

(22) PCT Filed: Jul. 27, 2001

(86) PCT No.: PCT/DE01/02862

§ 371 (c)(1),
(2), (4) Date: Apr. 28, 2003

(87) PCT Pub. No.: WO02/12741

PCT Pub. Date: Feb. 14, 2002

(65) Prior Publication Data

US 2003/0179961 A1 Sep. 25, 2003

(30) Foreign Application Priority Data

Aug. 3, 2000 (DE) .......................... 200 13 363 U

(51) Int. Cl.$^7$ ............................................. F16C 23/08
(52) U.S. Cl. ........................................ 384/57; 384/38
(58) Field of Search ............................. 384/57, 38, 56, 384/22, 7; 108/143; 248/429, 278.1; 74/5 R, 74/5.34, 89.36, 89.23, 89.32

(56) References Cited

U.S. PATENT DOCUMENTS

| 3,622,211 | A | * | 11/1971 | Mitton | .................. 384/56 |
| 3,745,840 | A | | 7/1973 | Guralnick | ................ 74/89.15 |
| 3,974,709 | A | * | 8/1976 | Janson et al. | ............ 74/424.91 |
| 4,264,112 | A | * | 4/1981 | Magnuson | .................... 384/29 |
| 4,637,738 | A | | 1/1987 | Barkley | ....................... 384/38 |
| 4,715,730 | A | * | 12/1987 | Magnuson | .................... 384/52 |
| 5,273,366 | A | * | 12/1993 | Tsukada | ...................... 384/45 |
| 5,329,825 | A | | 7/1994 | Askins | ...................... 74/89.15 |
| 5,388,913 | A | | 2/1995 | Cawley et al. | ................ 384/38 |
| 5,658,078 | A | * | 8/1997 | Cawley | .......................... 384/7 |
| 5,711,278 | A | * | 1/1998 | Santos et al. | ............... 123/501 |
| 6,672,763 | B1 | * | 1/2004 | Tschetschorke | ................ 384/9 |

FOREIGN PATENT DOCUMENTS

| DE | 1 575 613 | 5/1970 | .......... F16C 23/00 |
| DE | 34 28 680 | 2/1986 | .......... F16C 29/00 |
| FR | 2 534 521 | 4/1984 | .......... B30B 15/04 |
| GB | 2 334 312 | 8/1999 | .......... F16C 29/00 |
| JP | 6-10947 | 1/1994 | |
| WO | WO 87/00893 | 2/1987 | .......... F16C 23/04 |

* cited by examiner

Primary Examiner—Charles A. Marmor
Assistant Examiner—Justin K. Holmes
(74) Attorney, Agent, or Firm—Grossman Tucker Perreault & Pfleger, PLLC

(57) ABSTRACT

The invention relates to a movable bearing for a slide (9) guided on two shafts (4), with a linear bearing (3) guided on one of the shafts (4) and a bearing housing(2) that accommodates the linear bearing (3) and is connected to the slide (9) by a connector (1). In order to further develop a movable bearing of this kind such that the bearing offers a long service life, precise guidance of the slide parallel to the plane defined by the two shafts and relatively little assembly effort with correspondingly low assembly costs, a movable bearing is provided which has a connector (1) designed in such a way that the bearing housing (2) is mounted in a manner permitting movement transverse to the longitudinal direction of the respective shaft (4) and parallel to the shaft plane (7) defined by the axes (5, 6) of the two shafts (4).

9 Claims, 5 Drawing Sheets

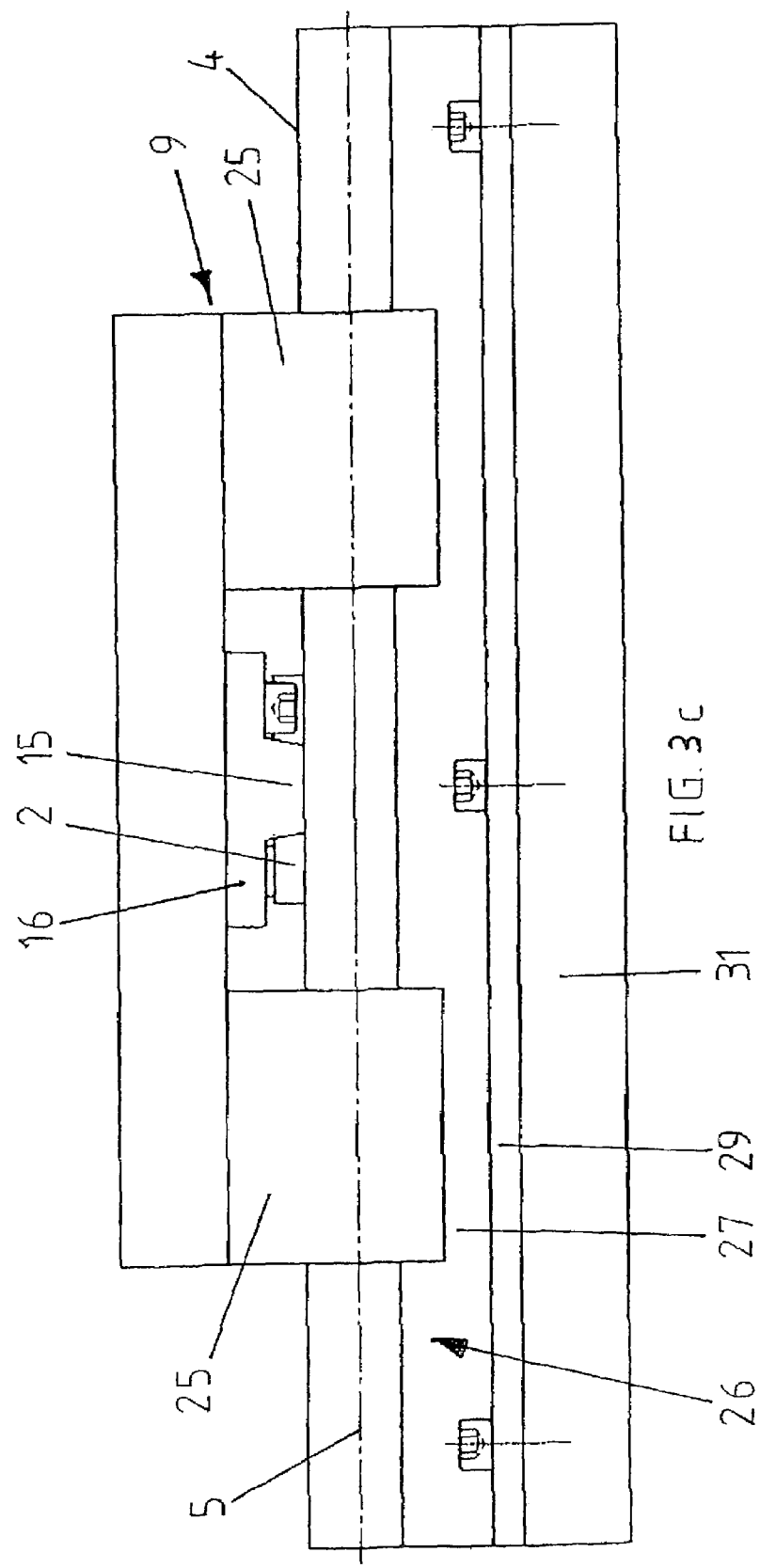

FLOATING BEARING

Figure 1A:
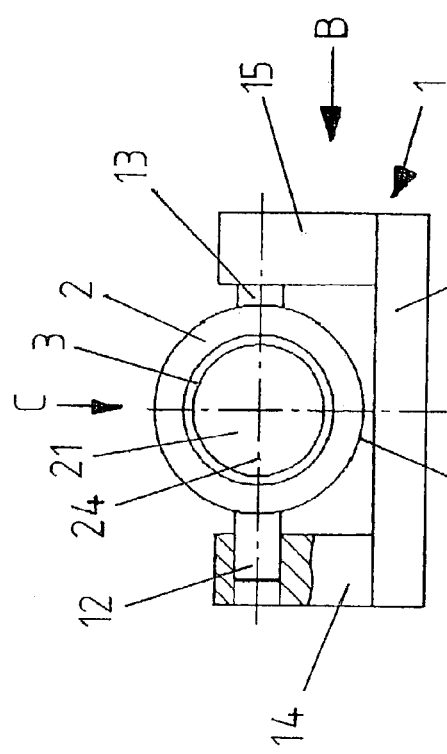

The invention relates to a movable bearing for a slide guided on two shafts, with a linear bearing guided on one of the shafts and a bearing housing that accommodates the linear bearing and is connected to the slide by a connector.

Because the slide is guided by at least one bearing on the one shaft, and by at least one bearing on the other shaft, the bearing of one of the shafts is expediently designed as a movable bearing that can compensate for the parallelism errors of the two shafts.

A movable bearing of the kind described in the opening paragraph is disclosed in U.S. Pat. No. 5,388,913 A. The connector connecting this movable bearing to the slide includes a bearing block for a spherical bearing which is mounted on the bearing housing of the linear bearing at its side adverted from the shaft. Furthermore, the connector comprises a support plate with yoke extensions through which a bolt passes. The bolt extends through the spherical bearing so that this bearing is movable together with the bearing block and the bearing housing for the linear bearing fixed to the bearing block transversly to the longitudinal direction of the shaft.

The bearing housing of the movable bearing disclosed in DE 198 05 974 C is connected to the slide by a fork like coupling. At the upper side of the bearing housing a ball is inserted into a bore, the ball running on the shaft guiding the movable bearing. At the lower side, the bearing housing is milled out to such an extent that the shaft is unencumbered. The slide comprises a prismatic groove in its upper fork part in which the ball runs. The lower fork part is formed by a leaf spring which reciliently abuts against the shaft and presses the upper fork part on the ball.

The movable bearing disclosed in FR 2534521 A comprises a bearing housing which is slidably arranged within an opening in the connector between the bearing housing and the slide transversly to the longitudinal direction of the shaft and within the shaft plane defined by the two shafts. By means of this design the side surfaces of the bearing housing parallel with respect to the plane defined by the two shafts slide on respective surfaces of the opening.

The object of the present invention is to further devolp a movable bearing of the kind described in the opening paragraph, such that the bearing offers a long service live, precise guidance of the slide parallel to the plane defined by the two shafts, relatively little assembly effort and a compact design.

According to the invention the object is solved in that a movable bearing of the kind described in the opening paragraph comprises two laterally projecting pins, lying transverse to the longitudinal direction of the respective shaft and within the shaft plane defined by the axes of the shafts, which are arranged in axially sliding fashion in guides of the connector located on the side of the bearing housing so that the bearing housing is movable transverse to the longitudinal direction of the respective shaft.

Because of the lateral arrangement of the connector with respect to the bearing housing an extremly compact design of the movable bearing is achieved. By means of the pins laterally mounted on the bearing housing and the corresponding guides, the assembly effort and the assembly costs can be reduced significantly.

The linear bearing for the movable bearing according to the invention can be any of the conventional types of linear bearings, particulary sliding or ball bearings. The movable bearing according to the invention can be connected to all standard sizes of linear bearings.

In order to be able to compensate for parallelism errors both in the shaft plane and also perpendicular to it, the connector in a preferred configuration of the invention is designed such that the bearing housing is mounted in pivoting fashion about an axis running transverse to the longitudinal direction of the shafts and parallel to the shaft plane.

In order for the bearing housing to additionally be mounted in pivoting fashion around the guide axis, the pins are of cylindrical design and pivot in the guides.

The connector can have a mounting plate for mounting on a base plate of the slide, where the guides for mounting the bearing housing are located on the mounting plate. For example, the mounting plate can be mounted on the base plate of the slide with the help of screws.

However, the guides can also be located directly on the base plate of the slide, so that the connector only encompasses the guides and the linear or pivot mount of the bearing housing.

In particular, the linear bearing of the movable bearing according to the invention can be designed as a plastic sliding bearing. The commercially available sliding bearings that correspond to the standard sizes can be used in this context.

The bearing housing of the movable bearing according to the invention can have an essentially cylindrical, closed space for receiving the essentially cylindrical linear bearing. A design of this kind can be considered when the ends of the two shafts are held by supports outside the range of motion of the slide.

If the supports extend over the range of motion of the slide on one side of the shafts, the bearing housing has an essentially cylindrical space with a longitudinal slit for receiving an essentially cylindrical linear bearing that also has a longitudinal slit. In this context, the longitudinal slits serve to receive the area in which the support is connected to the respective shaft.

The invention further relates to a slide, which is guided by a first and second shaft and has at least one bearing associated with the first shaft and at least one movable bearing associated with the second shaft. The movable bearing is designed in accordance with the present invention.

A preferred configuration of the slide is provided with two bearings associated with the first shaft, which have bearing housings that are stationary relative to the slide, and one movable bearing according to the invention associated with the second shaft, which is located at roughly half the distance between the two fixed bearings.

Under certain circumstances, several movable bearings according to the invention associated with the second shaft can be used on the slide.

Figure 1C:
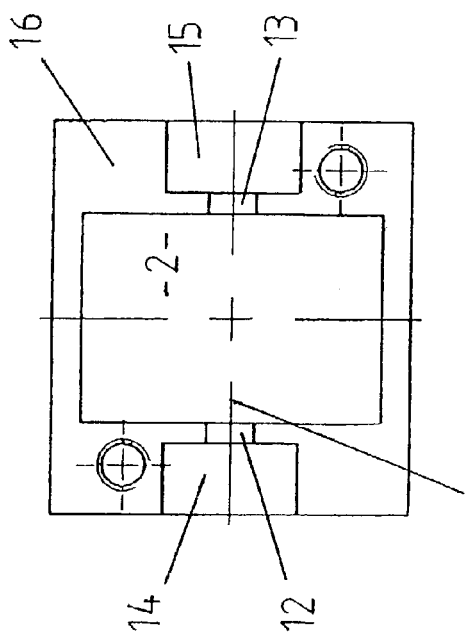
Figure 1B:
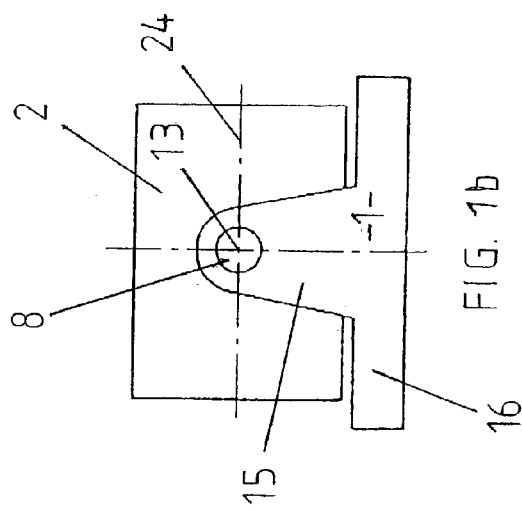
Figure 2A:
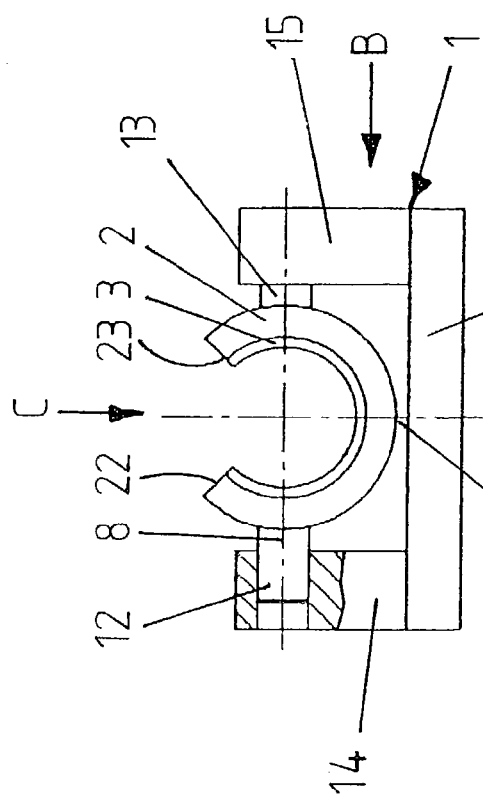
Figure 2C:
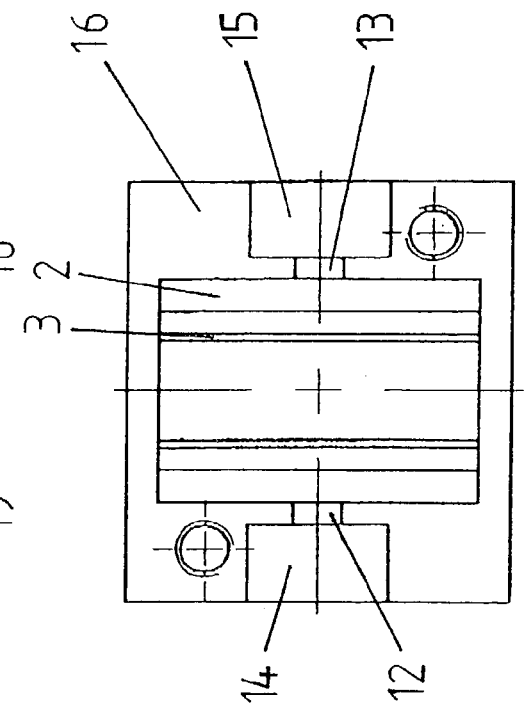
Figure 2B:
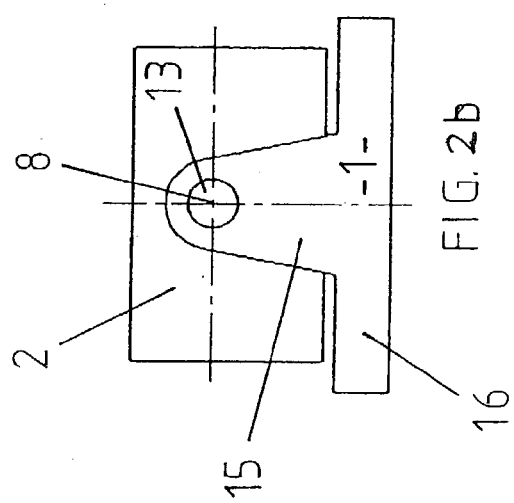
Figure 3A:
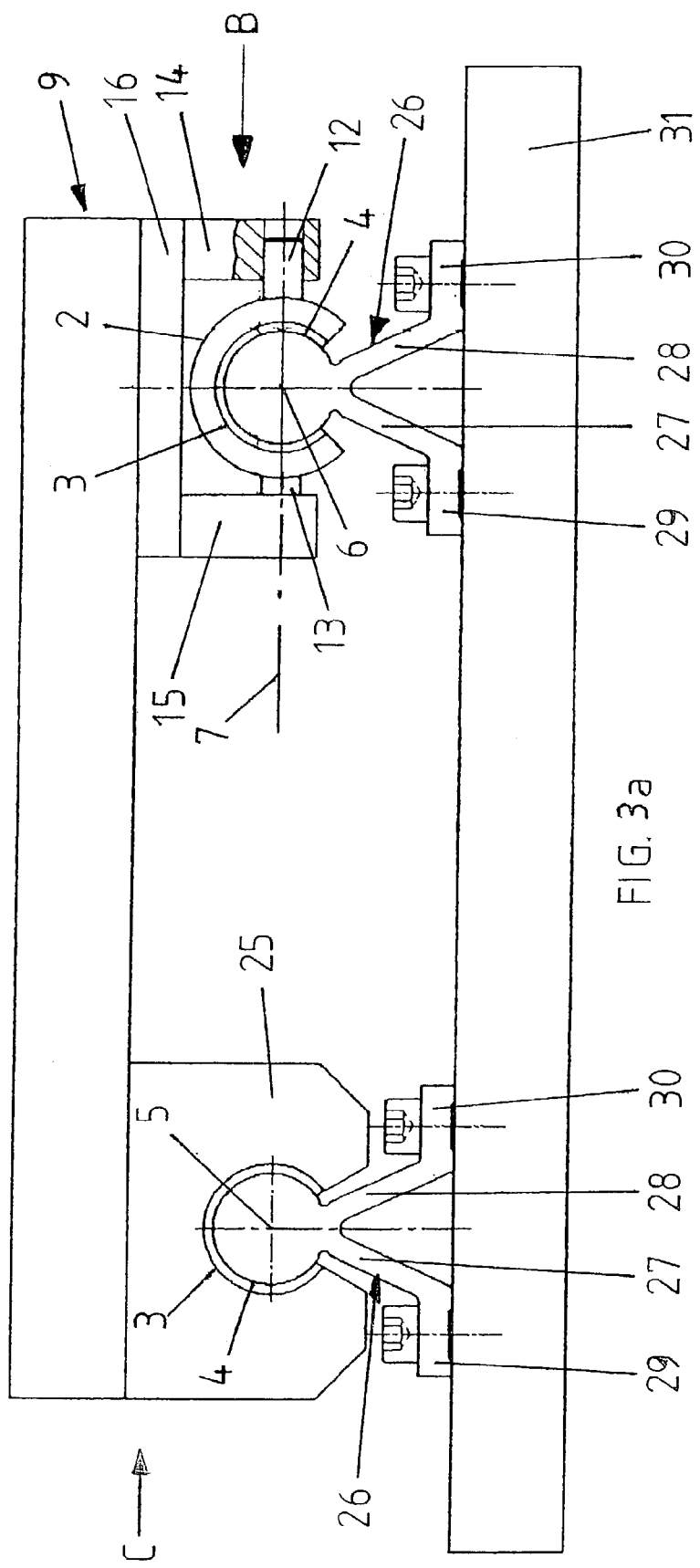

Several practical examples of the invention are described below on the basis of the drawings. The drawings show the following:

FIG. 1a A partially cut-away front view of a first practical example of the movable bearing, FIG. 1b A side view of the bearing in the direction of arrow B in FIG. 1a, FIG. 1c A top view in the direction of arrow C in FIG. 1a, FIG. 2a A partially cut-away front view of a second practical example, FIG. 2b A side view of the bearing in the direction of arrow B in FIG. 2a, FIG. 2c A top view in the direction of arrow C in FIG. 2a, FIG. 3a A front view of a slide guided on two shafts, with a movable bearing according to FIGS. 2a–c, FIG. 3b A side view of the slide in the direction of arrow B in FIG. 3a, FIG. 3c A side view of the slide in the direction of arrow C in FIG. 3a, As shown in FIGS. 1b to 2c of the three practical examples described, the movable bearing has a bearing housing 2 which is connected to the slide (cf. FIGS. 3a to 3c) by a connector 1 and accommodates linear bearing 3.

As described in detail below, connector 1 is designed such that bearing housing 2 is mounted in movable fashion transverse to the longitudinal direction of the respective shaft (cf. reference number 4 in FIG. 3b) and parallel to the shaft plane (cf. reference number 7 in FIG. 3a) defined by the axes (cf. reference numbers 5 and 6 in FIGS. 3a to 3c) of shafts 4.

Connector 1 is further designed such that bearing housing 2 is mounted in pivoting fashion about an axis 8 running transverse to the longitudinal direction of shafts 4 and parallel to shaft plane 7.

Connector 1 consists of a mounting plate 16, on which guides 14 and 15 are integrally moulded on either side of bearing housing 2. In the practical example shown in FIGS. 1a–1c, the bearing housing 2 comprises two the laterally arranged, cylindrical pins 12 and 13, which are slidably and pivotably supported in the guides 14 and 15. The pins 12 and 13 lie in the centre axis 24 of the bearing housing 2 which runs transvers to the longitudinal direction of the bearing housing 2 and parallel to the mounting plate 16.

Guides 14 and 15, which are integrally moulded on mounting plate 16 to the sides of bearing housing 2, have corresponding openings in which pins 12 of bearing housing 2 are mounted such that they can slide in the longitudinal direction of centre axis 24 and pivot around this axis.

Bearing housing 2 is supported by guides 14 and 15 such that the bottom side 19 of bearing housing 2 is at a distance from base plate 16 when bearing housing 2 is parallel to base plate 16. This distance, which can be kept relatively small, limits the pivoting angle of bearing housing 2 relative to base plate 16.

In the practical example shown in FIGS. 1a to 1c, bearing housing 2 has a cylindrical, closed space 21 for receiving a likewise cylindrical linear bearing 3. This bearing is therefore suitable for shafts mounted on a support outside the range of motion of the slide.

FIGS. 2a to 2c show a third practical example that differs from the practical example shown in FIGS. 1a to 1c only in that bearing housing 2 has a longitudinal slit 22 on the side opposite base plate 16. Linear bearing 3 located in bearing housing 2 is provided with a corresponding longitudinal slit 23. A bearing of this kind is suitable for shafts held in place by a support extending in the longitudinal direction below the shaft, as shown in FIG. 3a.

Figure 3B:
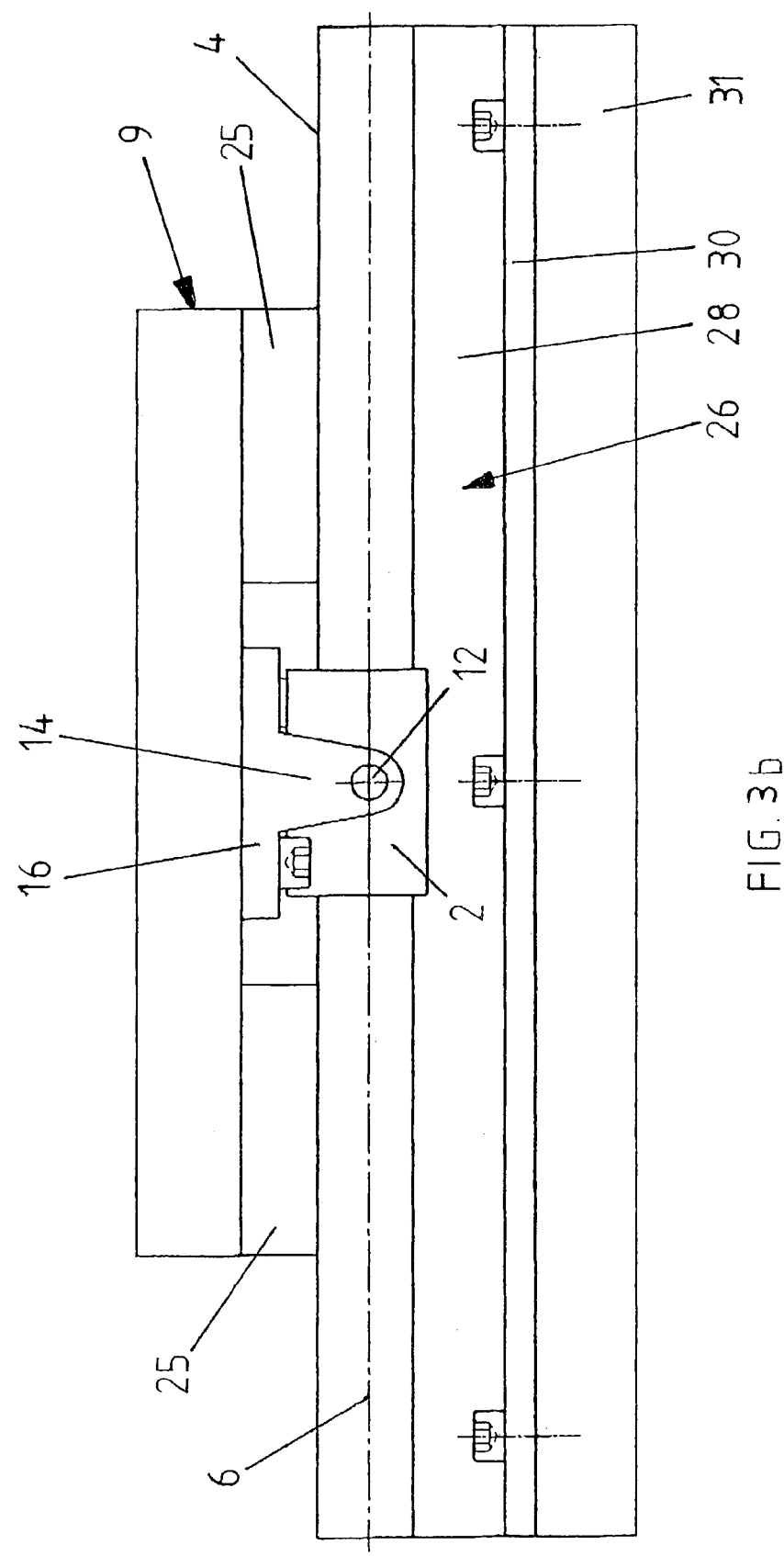

FIGS. 3a to 3c show an arrangement consisting of two essentially parallel shafts 4 and a slide 9 guided on them. Shaft 4 shown on the left in FIG. 3a is associated with two bearings (as shown particularly clearly in the side view in FIG. 3c) that are permanently connected to slide 9 and consist of a block-type bearing housing 25 and a linear bearing 3.

Shaft 4 shown on the right in FIG. 3a is associated with a movable bearing according to the practical example shown in FIGS. 2a to 2c. As shown in FIGS. 3b and 3c, this movable bearing is located at roughly half the distance between the two fixed bearing housings 25. Thus, it is capable of compensating for parallelism errors both in shaft plane 7 (cf. FIG. 3a) and perpendicular to shaft plane 7 when slide 9 moves.

As shown particularly clearly in FIG. 3a, the bottom sides of shafts 4 are provided with integrally moulded supports 26 extending over their length, so that bearing housings 2 and 25, and linear bearings 3 located therein, are provided with longitudinal slits.

Supports 26 are formed by the two legs 27 and 28 in the shape of an inverted V, the ends of which are provided with flanges 29 and 30, which lie in the same plane, for screw-mounting of supports 26 on base 31.

LIST OF REFERENCE NUMBERS

1 Connector
2 Bearing housing
3 Linear bearing
4 Shaft
5 Axis
6 Axis
7 Shaft plane
8 Axis
9 Slide
10 Shaft
12 Pin
13 Pin
14 Guide
15 Guide
16 Mounting plate
19 Bottom side
21 Cylindrical space
22 Longitudinal slit
23 Longitudinal slit
24 Centre axis
25 Bearing housing
26 Support
27 Leg
28 Leg
29 Flange
30 Flange
31 Base

What is claimed is:

1. Movable bearing for a slide guided on two shafts, with a linear bearing guided on one of the shafts and a bearing housing that accommodates the linear bearing and is connected to the slide by a connector, characterised in that the bearing housing comprises two laterally projecting pins lying transverse to the longitudinal direction of the respective shaft and within the shaft plane defined by the axes of the shafts, which are arranged in axially sliding fashion in guides of the connector located on the slide of the bearing housing, so that the bearing housing is movable transverse to the longitudinal direction of the respective shaft.

2. Movable bearing as per claim 1, characterised in that the connector is designed such that the bearing housing is mounted in pivoting fashion about an axis running transverse to the longitudinal direction of the shafts and within the shaft plane.

3. Movable bearing as per claim 1, characterised in that the pins are of cylindrical design and mounted in the guides in pivoting fashion around the cylinder axis.

4. Movable bearing as per claim 1, characterised in that the connector has a mounting plate for mounting on a base plate of the slide, which bears the guides for mounting the bearing housing.

5. Movable bearing as per claim 1, characterised in that the linear bearing is designed as a plastic sliding bearing.

6. Movable bearing as per claim 1, characterised in that the bearing housing has an essentially cylindrical, closed space for receiving an essentially cylindrical linear bearing.

7. Movable bearing as per claim 1, characterised in that the bearing housing has an essentially cylindrical space with a longitudinal slit for receiving an essentially cylindrical linear bearing that likewise has a longitudinal slit, where the longitudinal slits are designed to receive a support for the respective shaft.

8. Movable bearing of claim 1 comprising a slide which is guided by a first and second shaft and having at least one bearing associated with the first shaft and said movable bearing being associated with said second shaft.

9. Movable bearing of claim 8 characterised in that there are two bearings associated with the first shaft which have bearing housings that are stationary relative to the slide, said movable bearing associated with the second shaft which is located at about half the distance between the two fixed bearings.

* * * * *